(12) United States Patent
Jacobs et al.

(10) Patent No.: US 9,176,690 B2
(45) Date of Patent: Nov. 3, 2015

(54) METHOD AND SYSTEM FOR PRINT SHOP JOB ROUTING

(71) Applicant: Xerox Corporation, Norwalk, CT (US)

(72) Inventors: Timothy Wayne Jacobs, Fairport, NY (US); Alvaro E. Gil, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 85 days.

(21) Appl. No.: 13/722,043

(22) Filed: Dec. 20, 2012

(65) Prior Publication Data

US 2014/0176988 A1     Jun. 26, 2014

(51) Int. Cl.
*G06F 3/12* (2006.01)

(52) U.S. Cl.
CPC .............. *G06F 3/126* (2013.01); *G06F 3/1212* (2013.01); *G06F 3/1282* (2013.01); *G06F 3/1285* (2013.01)

(58) Field of Classification Search
None
See application file for complete search history.

(56) References Cited

U.S. PATENT DOCUMENTS

| 5,513,126 | A  |   | 4/1996  | Harkins et al. |
|-----------|----|---|---------|----------------|
| 6,650,433 | B1 | * | 11/2003 | Keane et al. ................. 358/1.15 |
| 7,051,328 | B2 |   | 5/2006  | Rai et al. |
| 7,065,567 | B1 | * | 6/2006  | Squires et al. ................. 709/223 |
| 8,059,292 | B2 |   | 11/2011 | Rai |
| 2009/0021773 | A1 |   | 1/2009 | Rai |
| 2009/0021775 | A1 |   | 1/2009 | Rai |
| 2009/0025000 | A1 |   | 1/2009 | Rai |
| 2009/0025002 | A1 | * | 1/2009 | Rai ............................... 718/102 |
| 2009/0025003 | A1 |   | 1/2009 | Rai |

OTHER PUBLICATIONS

Harchol-Balter, "The Effect of Heavy-Tailed Job Size Distributions on Computer System Design", In In Proc. of ASA-IMS Conf. on Applications of Heavy Tailed Distributions in Economics (1999) pp. 1-16.

* cited by examiner

*Primary Examiner* — King Poon
*Assistant Examiner* — Andrew H Lam
(74) *Attorney, Agent, or Firm* — Fox Rothschild LLP

(57) ABSTRACT

A print job processing system determines a set of job size thresholds for a set of print jobs received over a period of time by a print shop. The print shop includes multiple cells. The system orders the job size thresholds from lowest to highest, assigns the lowest job size threshold to a first one of the cells, assigns the highest job size threshold to a second one of the cells, and assigns each of the remaining thresholds to the remaining cells so that each of the cells has an assigned threshold. Then, when the system receives a print job, it determines a size for the received print job, identifies which of the cells has an assigned job size threshold that corresponds to the size of the received print job, and routes the received print job to the identified cell. The identified cell may then process the received print job.

11 Claims, 6 Drawing Sheets

METHOD AND SYSTEM FOR PRINT SHOP JOB ROUTING

BACKGROUND

In print shops that produce large sets of documents, such as credit card statements, other bills, marketing materials, or other transactional, customized or repeating documents, it is often the case that job arrivals and due dates follow a repeating pattern. The pattern may have rhythms and/or cycles, such as daily, monthly, weekly and/or annual cycles. Jobs that have shorter patterns typically have shorter due dates, and there can be large penalties if the jobs are late. If a job having a longer pattern and/or deadline arrives when a short deadline job is due, the job may disrupt operation and result in significant time and cost.

This document describes methods and systems that may help solve some or all of the problems described above, and that may provide additional benefits.

SUMMARY

In an embodiment, a print job processing system includes a processing device that determines a set of job size thresholds for a set of print jobs received over a period of time by a print shop. The print shop includes multiple cells. The system orders the job size thresholds from lowest to highest, assigns the lowest job size threshold to a first one of the cells, assigns the highest job size threshold to a second one of the cells, and assigns each of the remaining thresholds to the remaining cells so that each of the cells has an assigned threshold. Then, when the system receives a print job, it determines a size for the received print job, identifies which of the cells has an assigned job size threshold that corresponds to the size of the received print job, and routes the received print job to the identified cell. The identified cell may then process the received print job.

In some embodiments, when determining the job size thresholds, the system may perform multiple simulations of a print production cycle over the period of time, so that the simulations use multiple job size distributions. The system may identify the job size thresholds as those that optimize a print shop metric. When identifying the plurality of job size thresholds as those that optimize a print shop metric, the system may, for each of the cells in the print shop, determine a job size threshold for the cell that minimizes a difference between an upper boundary and a lower boundary of the print shop metric. In some embodiments, the system may continue to perform simulations of a print production cycle until the identified job size thresholds in each simulation converge.

An example print shop metric is a print job turnaround time (TAT). If so, determining the upper boundary and the lower boundary of the print shop metric for each cell may include determining a maximum TAT and a minimum TAT such that a difference between the maximum TAT and the minimum TAT is minimized. Other print shop metrics may include a number of late print jobs or a makespan for the set of print jobs.

In some embodiments, when identifying which of the cells has an assigned job size threshold corresponding to the size of the received print job, the system may identify which of the cells has an assigned threshold that is closest to and less than or equal to the size of the received print job. Alternatively, when identifying which of the cells has an assigned job size threshold corresponding to the size of the received print job, the system may identify which of the cells has an assigned threshold that is closest to and greater than or equal to the size of the received print job.

DETAILED DESCRIPTION

Figure 1:
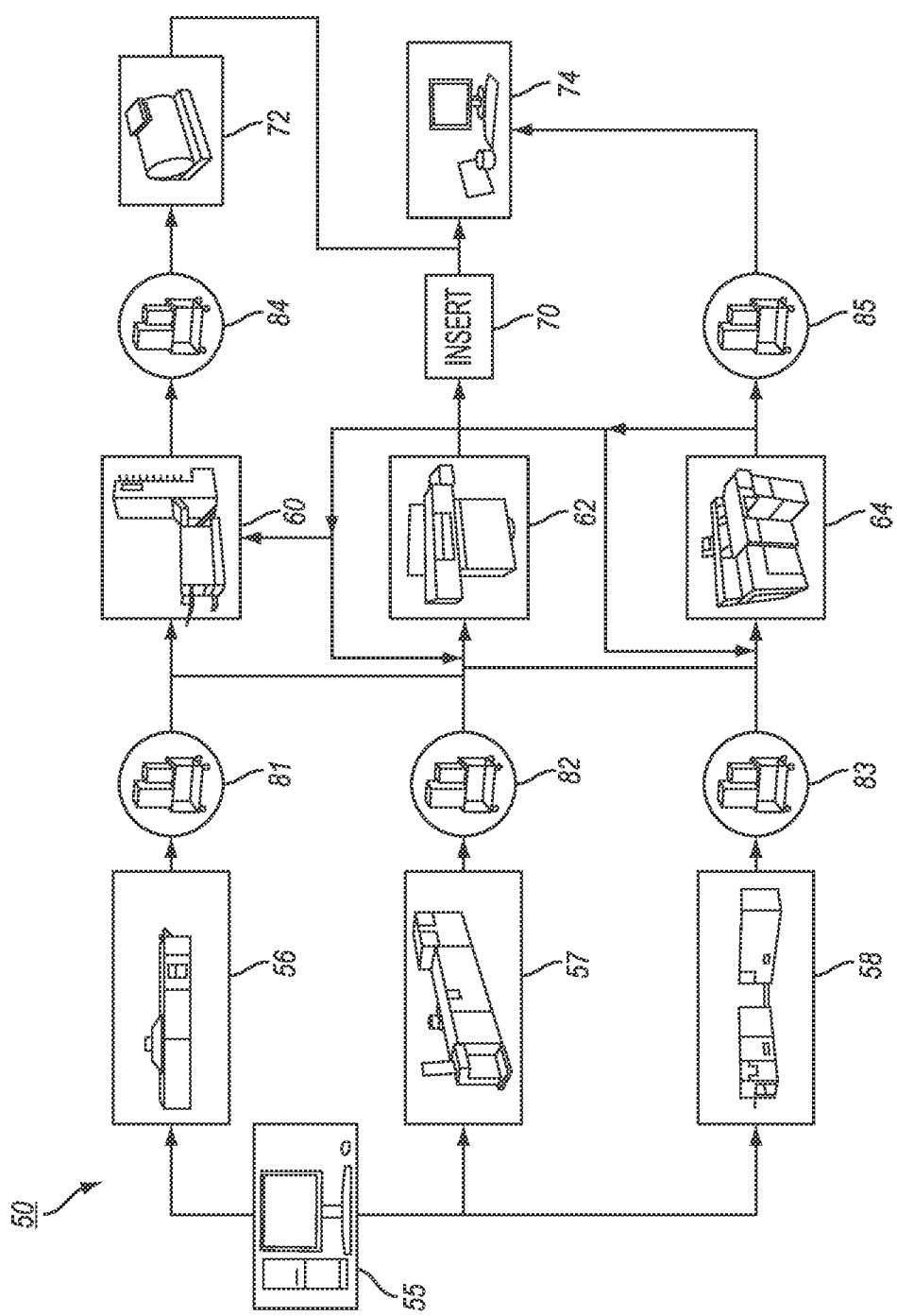
FIG. 1 is a block diagram illustrating various devices that may make up some or all of a print shop.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

For the purposes of this document, an "electronic device" refers to a device that includes a processor and a non-transitory, computer-readable memory. The memory may be integral to the device, or it may be remote from the device and accessible by the device via one or more communication networks. The memory may contain programming instructions that, when executed by the processor, are configured to cause the processor to perform one or more operations according to the programming instructions. Examples of electronic devices include computing devices, tablets, smart phones and printing devices having a processor and internal or access to an external memory.

A "print device" refers to a device capable of performing one or more functions, operations and/or services on a print job. For example, a print device may process a set of digital instructions to print a document on a substrate or perform other actions on the substrate. A print device may include a printer, a cutter, a collator, a scanner, a fax machine, a multi-function device or other similar equipment.

A "print job" refers to a logical unit of work that will yield a printed document when processed by one or more print devices. A print job may include a set of instructions to produce a set of documents such as credit card statements for a credit card company customer, bank statements for bank, marketing brochures or the like. Although the disclosed embodiments pertain to print jobs, the disclosed methods and systems can be applied to jobs in other production environments, such as automotive manufacturing, semiconductor production and the like.

A "print shop" refers to an entity that includes a multiple print devices, such as printers, cutters, collators and the like.

A print shop may be a freestanding entity, including one or more print devices, or it may be part of a corporation or other entity. A print shop may communicate with one or more servers via a communication network, such as the Internet, an intranet, a local area network, a wide area network, a wireless network and/or the like.

A "cell" is a subset of print devices within a print shop that is capable of processing a print job. In this document, when a print shop has multiple cells, each cell may itself include the print devices that are needed to process a print job and produce a document.

A "print job size" is a measurement of an amount of one or more resources needed to process a print job. For example, a print job size may be the number of pages in a print job, an amount of ink and/or toner needed to process the print job, an amount of processing time needed to complete the print job and/or the like.

"Processing" of a print job means performing one or more print job functions on a print job to transform the print job in some manner and/or result in the display, transmission or conversion of the print job to a physical substrate.

"Turnaround time" of a print job refers to the time difference between receipt of a print job by a cell and completion of the print job by a cell. Turnaround time may include processing time and non-processing time. "Average turnaround time" refers to the arithmetic mean of individual turnaround times.

A "makespan" refers to a difference between a maximum completion time associated with one or more print jobs and a minimum arrival time associated with the one or more print jobs. For example, a makespan associated with two print jobs, Print Job 1 {arrival time=8:05 a.m.; completion time=9:31 a.m.} and Print Job 2 {arrival time=8:10 a.m. and 9:24 a.m.} is 86 minutes (i.e., 9:31 a.m.-8:05 a.m.). An "average makespan" refers to the arithmetic mean of individual makespan values.

FIG. 1 shows an example of a print shop 50. Print jobs may enter the print shop manually or electronically and be collected at an electronic submission system 55, such as a computing device and/or scanner. Print jobs are sorted and batched at the submission system or another location, such as a workflow management system, before being delivered to one or more print engines, such as a color printer 56, black-and-white printer 57 and/or a continuous feed printer 58. Printed documents may exit the print engine and be delivered to one or more finishing devices or areas such as a collator 60, cutter 62 and/or binder 64. The finishing areas may include automatic or manual areas for such finishing activities, and they also may include an automatic or manual inserter 70. Finally, the documents may move to a postage metering station 72 and/or shipping station 74. Documents for print jobs may move from one location to another in the print shop by automatic delivery or manual delivery, such as by hand or by one or more paper carts 81-85. Each of the print engines shown in FIG. 1 may be part of a unique cell, such that each cell may process a print job or certain types of print jobs. Although the embodiments disclosed in this document refer to document production systems, print shops and print jobs, the disclosed embodiments can be applied to any other type of production systems, such as those that may be present in an automotive or automotive part manufacturing facility, an electronic device manufacturing facility, or a chemical production process.

Figure 2:
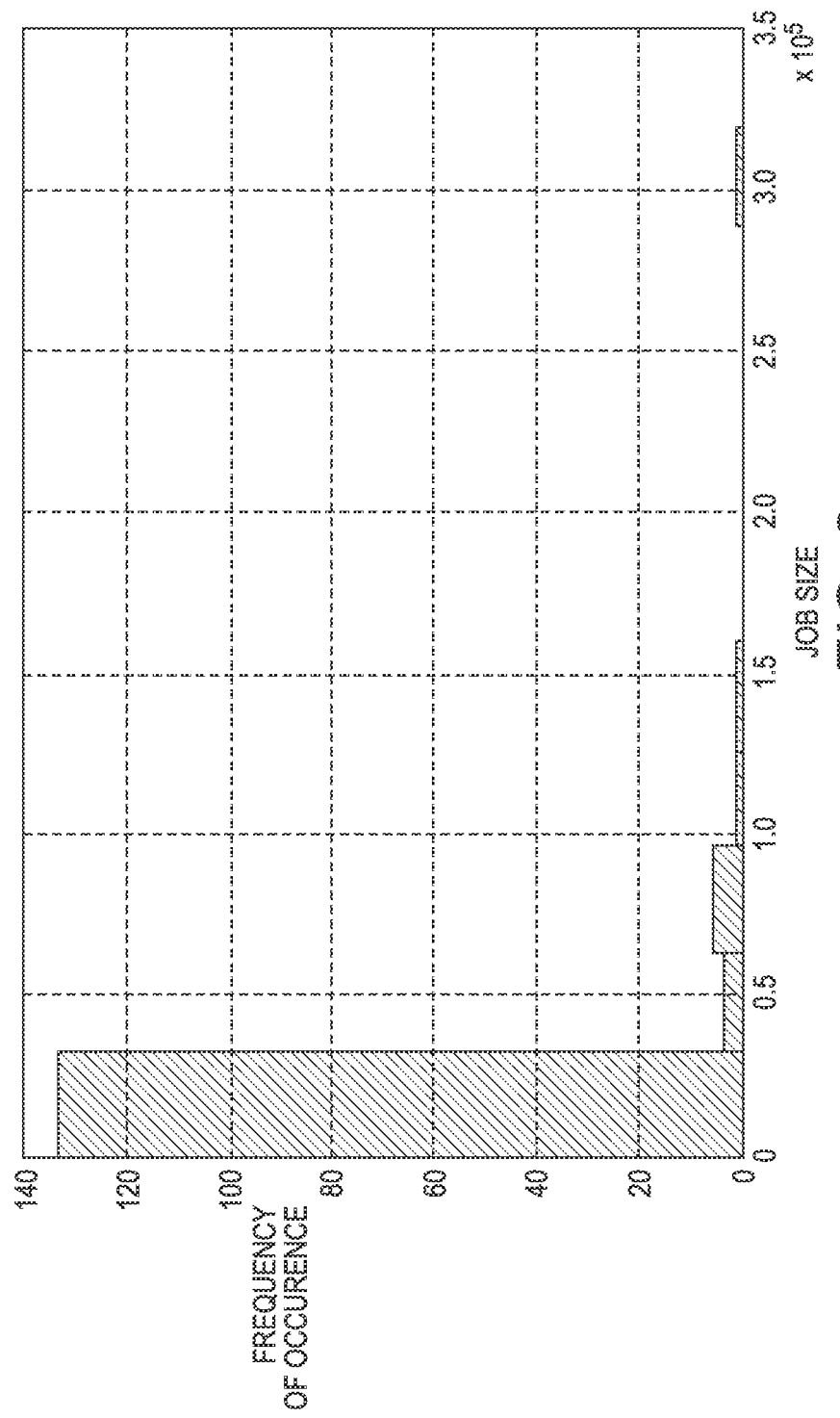
FIG. 2 is an example of a long-tailed job distribution.

There are various sources of uncertainty that may affect a print shop's ability to meet due dates in transactional print environments. One source of potential uncertainty is the long-tailed nature of job sizes in these systems. FIG. 2 illustrates an example job size distribution over a time period, where jobs of a size that is less than $0.5 \times 10^5$ units are the vast majority of the jobs in the distribution. However, there are still a significant number of jobs in the distribution that are larger than those represented in the head of the graph. These larger jobs extend far from the head, in this example as much as six times the size of the jobs shown in the head of the graph.

Consider, for example, average turnaround time (TAT) as a print shop metric of interest. In this case, the introduction of a very large job early in the production cycle can delay all the remaining jobs, thus increasing the average TAT of the entire list because all jobs must wait for the longer job to complete before they can start. Conversely, introducing the smallest jobs first in the production cycle may decrease the average TAT.

The ability to strictly order a job list, however, is often not possible due to varying arrival times, or other considerations that dictate job grouping by attributes not related to size. In continuous feed environments, for instance, jobs should be grouped by the paper stock to avoid time consuming paper roll changeovers. This creates uncertainty with respect to job order. Such uncertainties in the print environment result in lack of robustness with respect to the metric of interest.

Figure 3:
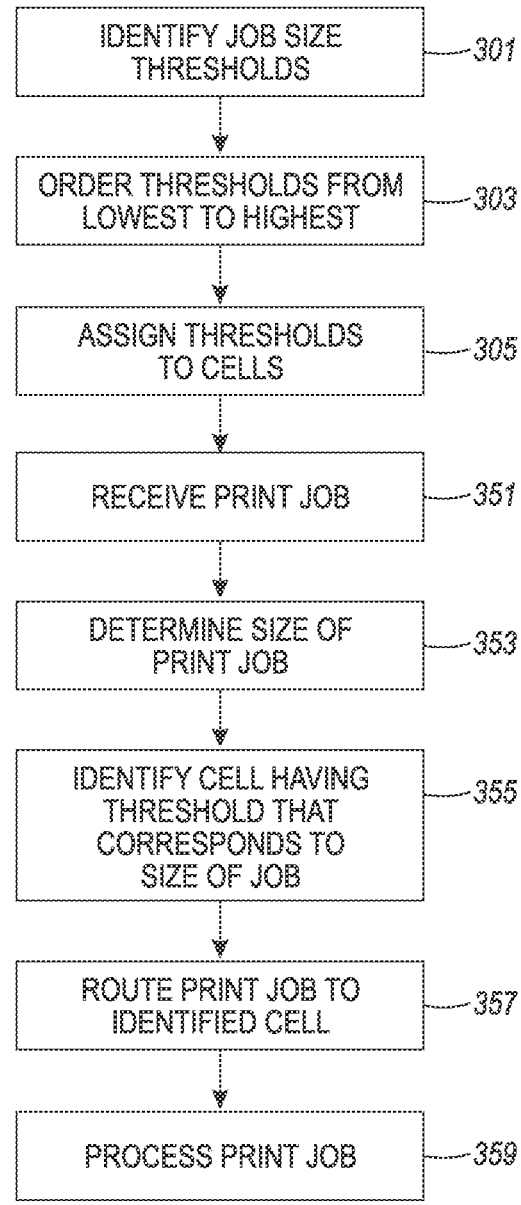
FIG. 3 is a flowchart illustrating an example print job assignment process.

In order to improve robustness in the presence of such uncertainties this document describes improved methods and systems for routing print jobs to various cells in a multi-cell print shop. FIG. 3 is a flowchart that illustrates various steps that the system may follow. Referring to FIG. 3, the system may include a data storage facility containing data about a set of print jobs that were processed over a time period. The system may analyze the data to determine a group of job size thresholds for the set of print jobs 301. The system may order the job size thresholds from lowest to highest 303. (As used in this document, the phrase "lowest to highest" is intended to be synonymous with "highest to lowest" as both have equivalent results.) The system may then assign the thresholds to the cells on a one-to-one basis 305 by assigning the lowest job size threshold to a first one of the cells, assigning the highest job size threshold to a second one of the cells, and assigning each of the remaining thresholds to the remaining cells so that each of the cells has an assigned threshold.

In various embodiments, when determining the job size thresholds 301 the system may use the stored data to performing multiple simulations of a print production cycle over the period of time, using various job size distributions. If so, it may identify the job size thresholds as those that optimize a print shop metric. To do this, the system may use an optimization algorithm that determines job size threshold for the cell that minimizes a difference between an upper boundary and a lower boundary of the print shop metric. Suitable print shop metrics may include metrics such as TAT, a number of late print jobs, a makespan for the set of print jobs, a process cycle efficiency metric, or some other measurement.

As an example of an optimization algorithm, where the print shop metric is TAT, consider a case where N represents the number of cells available in the print shop. Let $TAT^i\_up$ and $TAT^i\_dn$ denote the upper and lower average TAT boundaries respectively for any given job size distribution $x^i$, i=1, 2, ..., m processed by the shop. The upper boundary $TAT^i\_up$ can be obtained by processing the job size distribution $x^i$ from the largest to smallest job size, whereas $TAT^i\_dn$ can be obtained by processing $x^i$ from the smallest to largest job size. With these variables, an optimization process may, for any job size distribution i, find the threshold job size value $th^{j,i}$, j=1, 2, ..., N−1, such that the difference between the average TAT bounds are minimized. Mathematically, this can be expressed as:

Find $th^{j,i} \epsilon R^{N-1}$

Such that $\Delta TAT^i = \min(TAT^i\_up - TAT^i\_dn)$

Once every $th^{j,i}$ is derived for every job size distribution i typically processed by the print shop, a threshold scheduling approach may be used to route jobs to each cell. When the system receives a print job 351, it may determine a size for the received print job 353, identify which of the cells has an assigned job size threshold that corresponds to the size of the received print job 355, and route the received print job to the identified cell 357. For example, assume that the print shop needs to process jobs with a known distribution $x^i$. Thus, any job size less or equal to $th^{1,i}$ will be routed to cell 1, jobs greater than $th^{1,i}$ and less or equal to $th^{2,i}$ will be routed to cell 2, and so on. Any job size in the distribution greater than $th^{N-1,i}$ will be routed to cell N. The identified cell may process the received print job 359 by using its various hardware components to produce one or more printed documents in accordance with the print job.

As an example, consider the case of a print shop using a production cycle of two days. If a batch of jobs arrived at the print shop on 12:00 AM on February 10, the jobs would all be due for completion by 8:30 AM on February 11. Each job requires a print operation and an insert operation, with setup times required for each inserter and printer for each job. There are two identical cells in the shop (i.e., N=2), such that cell has two inserters and two printers. Another assumption in this simulation is that the printers and inserters were not available during the entire 32.5 hours because of down times, breaks, etc.

Table 1 below shows an experimental design that covers a range of equipment availabilities, job size distributions within a production cycle (Job Size), and number of jobs arriving for the production cycle (List Size) in a two-cell job shop. The simulation included 25 runs. Here, the List Size column reports the number of jobs for that production cycle, and Job Size reports the median job size in the list. The Availability column reports a percentage up time.

TABLE 1

| Production Cycle | List Size | Job Size | Availability (%) |
|---|---|---|---|
| 1 | 121 | 37 | 90 |
| 2 | 96 | 87 | 94 |
| 3 | 174 | 123.5 | 87.33 |
| 4 | 96 | 177 | 91.33 |
| 5 | 175 | 212 | 95.33 |
| 6 | 150 | 258 | 88.67 |
| 7 | 228 | 284.5 | 92.67 |
| 8 | 124 | 348 | 96.67 |
| 9 | 203 | 379 | 86.44 |
| 10 | 178 | 430 | 90.44 |
| 11 | 256 | 458.5 | 94.44 |
| 12 | 179 | 521 | 87.78 |
| 13 | 257 | 549 | 91.78 |
| 14 | 232 | 599 | 95.78 |
| 15 | 311 | 628 | 89.11 |
| 16 | 194 | 696 | 93.11 |
| 17 | 272 | 726 | 97.11 |
| 18 | 246 | 775.5 | 86.89 |
| 19 | 326 | 803.5 | 90.89 |
| 20 | 247 | 862 | 94.89 |
| 21 | 326 | 892.5 | 88.22 |
| 22 | 301 | 931 | 92.22 |
| 23 | 379 | 977 | 96.22 |
| 24 | 276 | 1048 | 89.56 |
| 25 | 42 | 6 | 75.69 |

Figure 4:
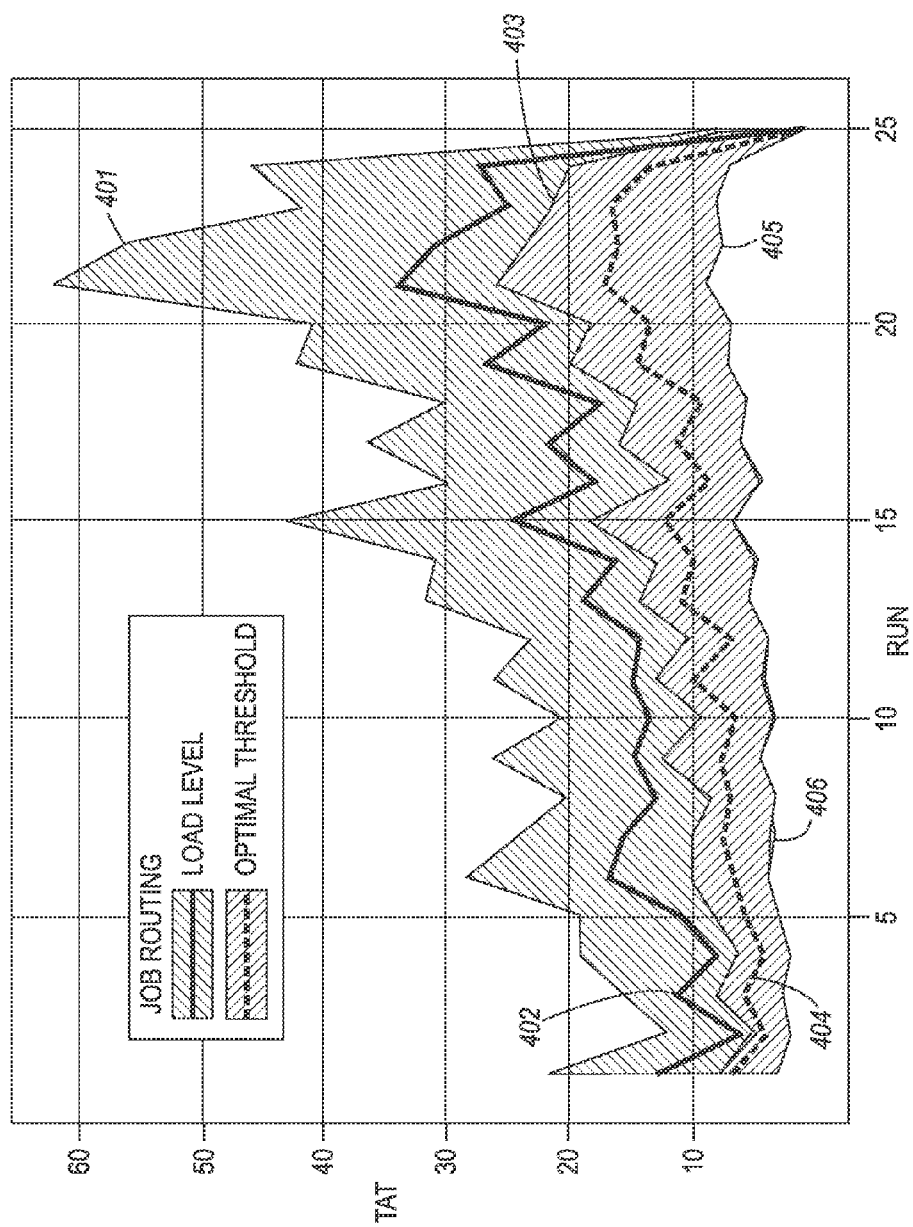
FIG. 4 illustrates an example of average turnaround time simulations for a job distribution.

Average TATs for each row in Table 1 use simulations employing an optimal job size threshold algorithm described above. The average TAT results are shown in FIG. 4. For each of the 25 runs listed in Table 1, four simulations were run as follows: (1) one simulation used a default cell routing using a job ordering to give the lowest average TAT for the job list; (2) one simulation used a default cell routing (i.e., a load balancing routing) using a job ordering to give the highest average TAT for the job list; (3) one simulation used the optimal size-based routing described above using a job ordering to give the lowest average TAT for the job list; and (4) one simulation used the optimal size-based routing described above using a job ordering to give the highest average TAT for the job list.

In FIG. 4, the area between lines 401 and 406 shows the uncertainty in average TAT for the shop if jobs are routed to the two cells according to a default load balancing approach. It is defined by the difference between the highest and lowest average TAT values for each of the 25 runs. Line 402 within this area represents the average TAT obtained from a random job order for this routing method. The area between lines 403 and 405 shows the uncertainty in average TAT for the shop if the jobs are routed according to the optimal threshold as defined in this ID. Line 404 in this area represents the average TAT for a random job order for this routing method.

Figure 5:
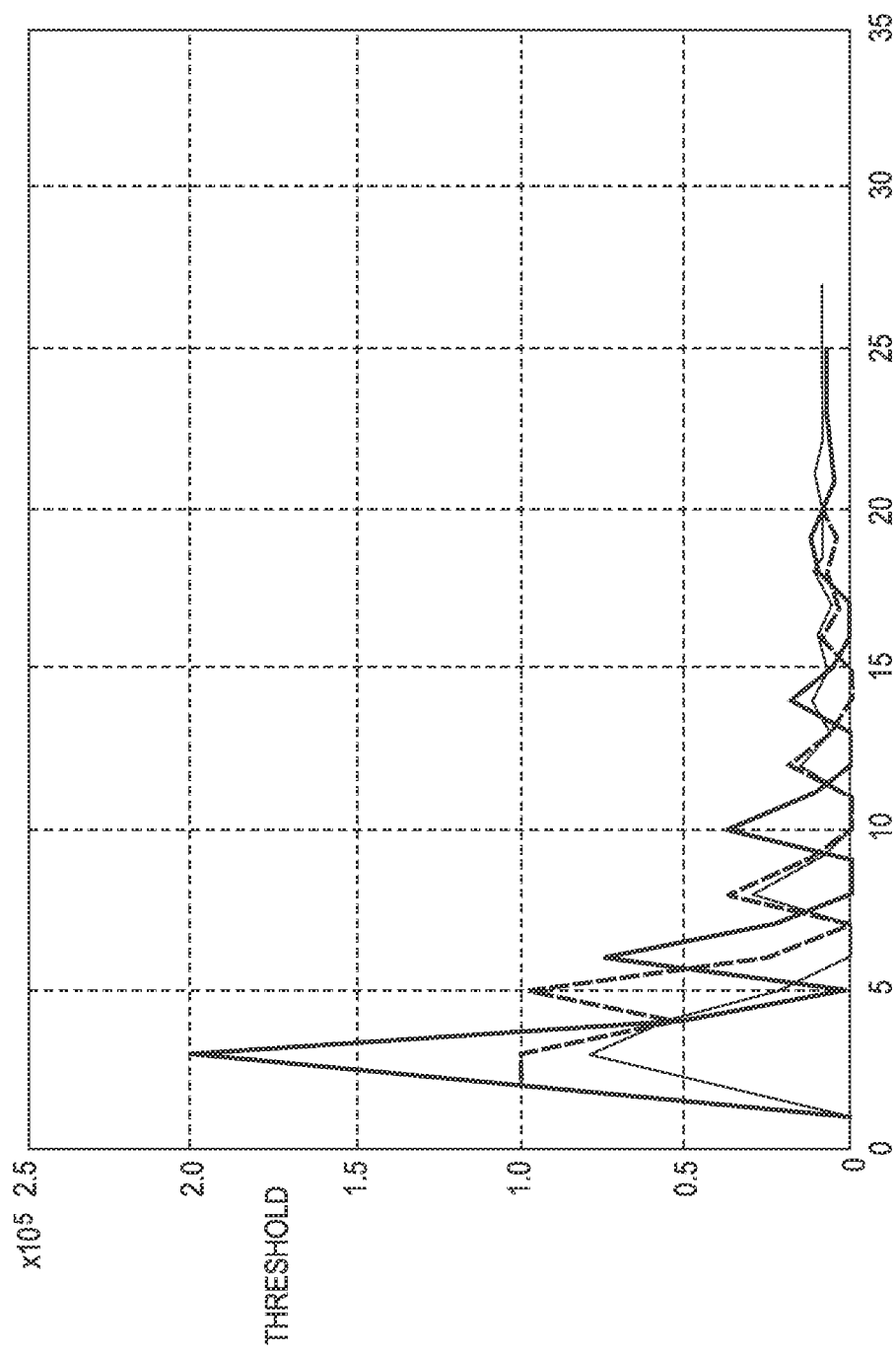
FIG. 5 is a chart showing the results of multiple example simulations in a two-cell print shop.

In the above described simulations, the optimal job size threshold for routing between two cells was determined using the Nelder-Mead Simplex method to provide average TAT values. Other optimization functions may be used. In this example, two simulations were run, one using a job size ordering from small to large, and the other from large to small. The difference between the average TAT values, $\Delta TAT^i$, resulting from each run were used in the optimization search. The objective was to find the job size threshold that minimized the average TAT difference. The rationale for this objective function is that we want average TAT to be relatively insensitive to job order. Additional simulations may be performed until the data converges. Convergence can be determined various ways. For example, when a maximum number of iterations is reached, when the standard deviation of the $\Delta TAT$ of the simplex vertices is less than or equal to a tolerance value, or the absolute difference between the largest and smallest values in the simplex is less than or equal to a tolerance value. An example showing convergence of threshold data after 25 iterations is shown in FIG. 5.

Figure 6:
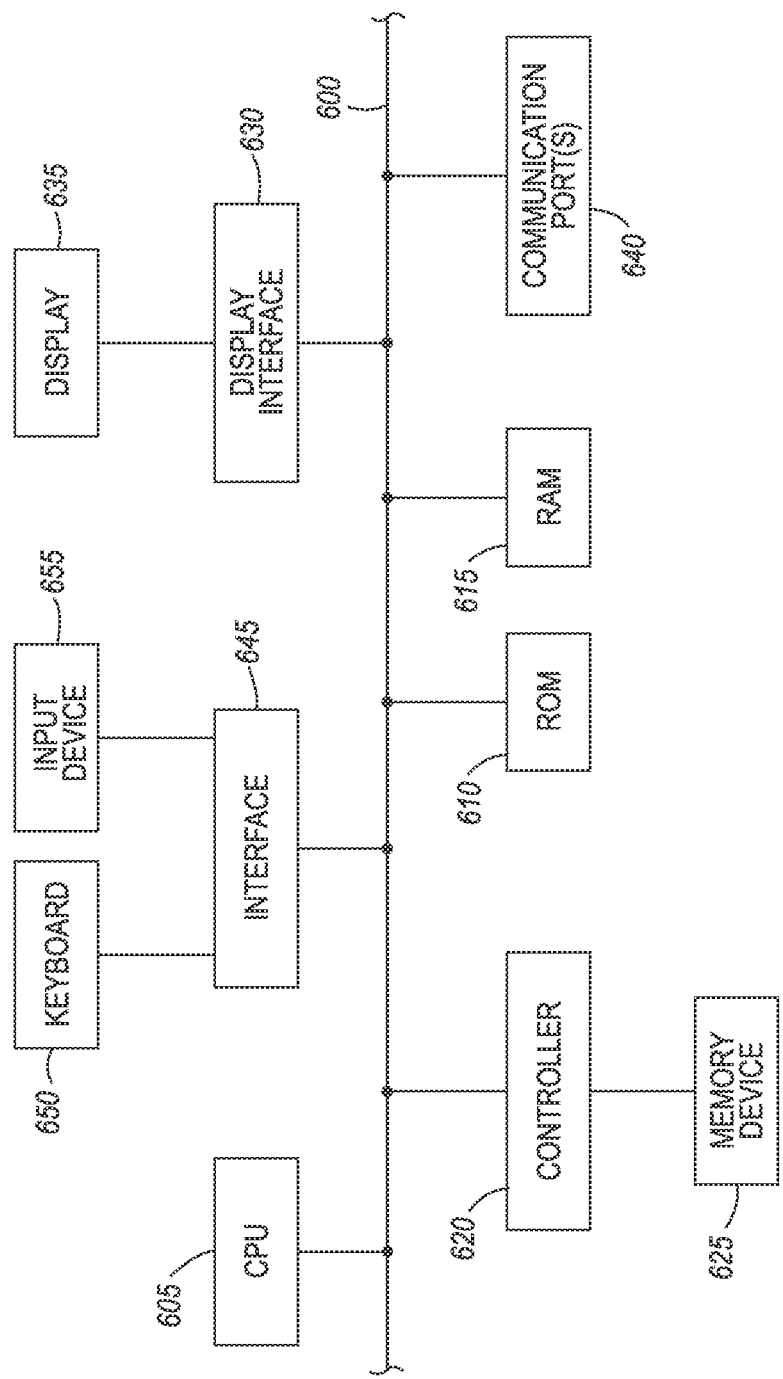
FIG. 6 is a block diagram illustrating various hardware that may be included in an electronic device that implements various processes described in this document.

FIG. 6 depicts an example of internal hardware that may be used to contain or implement the various computer processes and systems as discussed above. An electrical bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 6, is a processing device, computing device or processor as such terms are used within this disclosure. Read only memory (ROM) 610 and random access memory (RAM) 615 constitute examples of memory devices.

A controller 620 interfaces with one or more optional memory devices 625 that service as date storage facilities to the system bus 600. These memory devices 625 may include, for example, an external DVD drive or CD ROM drive, a hard drive, flash memory, a USB drive or another type of device that serves as a data storage facility. As indicated previously, these various drives and controllers are optional devices. Additionally, the memory devices 625 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

A display interface 630 may permit information from the bus 600 to be displayed on the display 635 in audio, visual, graphic or alphanumeric format. Communication with external devices may occur using various communication ports 640. A communication port 640 may be attached to a communications network, such as the Internet, a local area network or a cellular telephone data network.

The hardware may also include an interface 645 which allows for receipt of data from input devices such as a keyboard 650 or other input device 655 such as a remote control, a pointing device, a video input device and/or an audio input device.

The features and functions described above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of processing a print job comprising, by at least one processor:
   retrieving, from a data storage facility, data about a set of print jobs that were processed over a period of time;
   determining a plurality of job size thresholds for the set of print jobs that were processed over a period of time by a print shop having a plurality of cells, wherein the determining comprises:
      performing a plurality of simulations of a print production cycle over the period of time, wherein the plurality of simulations use a plurality of job size distributions, and
      identifying the plurality of job size thresholds as those that optimize a print job metric that comprises a print job turnaround time (TAT) by, for each of the cells in the print shop, determining a job size threshold for the cell that minimizes a difference between a maximum TAT and a minimum TAT;
   assigning the determined thresholds to the cells by:
      ordering the job size thresholds from lowest to highest,
      assigning the lowest job size threshold to a first one of the cells,
      assigning the highest job size threshold to a second one of the cells, and
      assigning each of the remaining thresholds to the remaining cells so that each of the cells has an assigned threshold; and
   receiving a print job;
   determining a size for the received print job;
   identifying which of the cells has an assigned job size threshold that corresponds to the size of the received print job; and
   routing the received print job to the identified cell.

2. The method of claim 1, further comprising, by the identified cell, processing the received print job.

3. The method of claim 1, wherein the print shop metric also comprises a number of late print jobs or a makespan for the set of print jobs.

4. The method of claim 1, wherein identifying which of the cells has an assigned job size threshold corresponding to the size of the received print job comprises identifying which of the cells has an assigned threshold that is closest to and less than or equal to the size of the received print job.

5. The method of claim 1, wherein identifying which of the cells has an assigned job size threshold corresponding to the size of the received print job comprises identifying which of the cells has an assigned threshold that is closest to and greater than or equal to the size of the received print job.

6. The method of claim 1, wherein performing the plurality of simulations of a print production cycle comprises performing the simulations until the identified job size thresholds in each simulation converge.

7. A print shop system, comprising:
   a plurality of cells, each of which comprises hardware that is capable of processing a print job;
   at least one processor; and
   a computer-readable memory storing programming instructions that, when executed, are configured to instruct at least one of the processors to:
      retrieve data about a set of print jobs that were processed over a period of time,
      perform a plurality of simulations of a print production cycle over the period of time, wherein the plurality of simulations use a plurality of job size distributions,
      determine a plurality of job size thresholds for the set of print jobs that were processed over a period of time by identifying the plurality of job size thresholds as those that optimize a print job metric that comprises a print job turnaround time (TAT) by, for each of the cells in the print shop, determining a job size threshold for the cell that minimizes a difference between a maximum TAT and a minimum TAT,
      assign the determined thresholds to the cells by:
         ordering the job size thresholds from lowest to highest,
         assigning the lowest job size threshold to a first one of the cells,
         assigning the highest job size threshold to a second one of the cells, and
         assigning each of the remaining thresholds to the remaining cells so that each of the cells has an assigned job size threshold,
      receive a print job,
      determine a size for the received print job,
      identify which of the cells has an assigned job size threshold that corresponds to the size of the received print job, and
      route the received print job to the identified cell.

8. The system of claim 7, further comprising at least one print device that is part of the identified cell, wherein the print device processes the received print job.

9. The system of claim 7, wherein the instructions to identify which of the cells has an assigned job size threshold corresponding to the size of the received print job comprise instructions to identify which of the cells has an assigned threshold that is closest to and less than or equal to the size of the received print job.

10. The system of claim 7, wherein the instructions to identify which of the cells has an assigned job size threshold corresponding to the size of the received print job comprise instructions to identify which of the cells has an assigned threshold that is closest to and greater than or equal to the size of the received print job.

11. The system of claim 7, wherein the instructions to perform the plurality of simulations of a print production cycle comprise instructions to perform the simulations until the identified job size thresholds in each simulation converge.

* * * * *